(12) United States Patent
Laubenstein

(10) Patent No.: US 7,971,555 B1
(45) Date of Patent: Jul. 5, 2011

(54) METHOD OF TREATING WASTE FROM A CHICKEN HOUSE USING SHORT PAPER FIBERS

(76) Inventor: Joseph W. Laubenstein, Conroe, TX (US)

( * ) Notice: Subject to any disclaimer, the term of this patent is extended or adjusted under 35 U.S.C. 154(b) by 971 days.

(21) Appl. No.: 11/262,456

(22) Filed: Oct. 28, 2005

(51) Int. Cl.
*A01K 31/04* (2006.01)
*C05F 3/00* (2006.01)

(52) U.S. Cl. .......................................... 119/479; 71/21

(58) Field of Classification Search ................ 71/11, 21; 119/479
See application file for complete search history.

(56) References Cited

U.S. PATENT DOCUMENTS

| | | | | |
|---|---|---|---|---|
| 4,397,674 A * | 8/1983 | Laughbaum | ........................ | 71/9 |
| 4,451,154 A * | 5/1984 | Zimmerman | ................. | 366/186 |
| 4,813,996 A * | 3/1989 | Gardner et al. | .................... | 71/21 |
| 4,909,825 A * | 3/1990 | Eigner | ................................ | 71/9 |
| 5,728,192 A * | 3/1998 | Andrew, Jr. | ........................ | 71/26 |
| 5,730,772 A * | 3/1998 | Staples | ................................ | 71/9 |
| 6,863,826 B2 * | 3/2005 | Sheets | ........................... | 210/705 |
| 2004/0005698 A1 * | 1/2004 | Chenu | ........................ | 435/290.2 |

OTHER PUBLICATIONS

K. Ekinci et al, "Composting Short Paper Fiber with Broiler Litter and Additives", Compost Science & Utilization (2000), vol. 8, No. 2, 160-172.*

* cited by examiner

*Primary Examiner* — Wayne Langel
(74) *Attorney, Agent, or Firm* — Locke Lord Bissell & Liddell LLP

(57) ABSTRACT

A method of treating waste from chickens in a chicken house includes applying a layer of short paper fibers over a floor of the chicken house horizontally below the chickens in the chicken house, mixing manure from the chickens with the layer of short paper fibers, and removing the mixed manure and short paper fibers from the chicken house. The manure is turned with the layer of short paper fibers such that the manure and the short paper fibers are intimately mixed together. The removed mixture can be spread over land.

16 Claims, 3 Drawing Sheets

METHOD OF TREATING WASTE FROM A CHICKEN HOUSE USING SHORT PAPER FIBERS

RELATED U.S. APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention relates to methods for treating chicken manure. More particularly, the present invention relates to methods of treating chicken manure as produced by egg-laying chickens within a chicken house. Additionally, the present invention relates to methods for treating chicken manure by adding short paper fibers to the manure.

BACKGROUND OF THE INVENTION

For years, the poultry egg industry has managed their manure by allowing it to accumulate in the chicken houses over periods of two to three years. The manure falls to the floor beneath the bird cages. This practice resulted in manure with a high percentage of moisture, high ammonia gas releases to the atmosphere, high populations of flies, and extreme odors. The end product manure is very high in moisture. This adds cost to the transport of such manure to utilization sites. Additionally, the high moisture content tends to inhibit the ability to store the manure on the field, tends to increase energy costs, and also results in odor and fly nuisances. In the past, when the manure accumulated to a level where it had a negative effect on the health of the chickens, the manure was removed. The adverse health effects caused by manure accumulation results in reduced egg production and increase in the chicken mortality rates.

In the past, upon removal of the manure, the typical practice is to apply it to farmlands for the nutrient value of the manure. For many years, these application rates were based on the nitrogen content in the manure and the crop to be grown on the land. Later, it was realized that the manure application based on the nitrogen content caused extreme phosphorous pollution to both surface and ground waters. The application rate of the manure was never managed until the implementation of the CAFO rules. Nutrient management programs in many states for CAFO operations were changed from nitrogen loading to phosphorous loading. This change resulted in many lands close to the poultry operations not being able to receive any manure due to the high soil concentrations of phosphorous from the previous heavy loading rates. This has resulted in the egg laying farmers incurring additional expenses in transporting their manure to farther lands away from their operations that had not previously received high manure applications. Farmers had to purchase trucks for transporting the manure, along with higher fuel costs in order to transport the manure higher distances.

Short paper fibers are a byproduct and waste product of paper-making operations. Short paper fibers contain short paper fibers that are too short to go into the final paper product. Short paper fibers also includes paper fillers such as calcium carbonate, starches, titanium oxide, kaolin clay, along with spent biological microorganisms that are used to purify the water in the treatment process. The short paper fibers that are generated from the waste water treatment plant are used to purify the process water before being released to the environment or recirculated back to the paper-making process. The short paper fiber material is the solids that are generated from the water purification process. For years, short paper fiber material has been disposed of through landfilling. As costs for landfill disposal have increased, the paper industry looked for other beneficial uses for the short paper fiber material. Since short paper fiber material is innocuous of any heavy metals and other contaminants, the industry has developed many beneficial products from the short paper fiber material.

Flies are a major problem in hen houses and the surrounding environment. Accumulated untreated chicken droppings result in an environment that is very conducive to the generation of flies. Flies are an impediment to the health of the chickens and also a nuisance to surrounding neighbors and employees that work in the hen houses. In the past, farmers have employed numerous strategies for fly control. These strategies have included the spraying of insecticides, the injection of beneficial wasps which prey upon the larva of the flies, the installation of sticky fly strips, and other methods.

Chicken droppings are very high in nitrogen. As the chicken droppings accumulate under the bird cages, large quantities of ammonia gas are generated. This gas needs to be ventilated out of the chicken houses. In the past, this has been accomplished through the use of large fans that are built into the outside walls of the chicken houses. The fans force the air to the outside atmosphere where it mixes and disperses into the environment. Since the smell of the ammonia is a terrible nuisance and since ammonia can be toxic at certain levels, it is desirable to reduce the amount of ammonia that is released from such chicken houses.

In the past, various patents have issued relating to techniques for treating chicken waste and also for the use of such short paper fibers. For example, U.S. Pat. No. 2,708,418, issued on May 17, 1995 to Sugarman et al., teaches an animal bedding for a poultry. This animal bedding is intended to absorb liquids and manure from such chickens. The bedding is manufactured from paper pulp. The paper pulp is dried so as to be completely dust-free and highly resistant to disintegration under the constant scratching of poultry. The bedding material is treated with disinfectants, germicides, fungicides or similar agents suitable for the purposes of preventing mold formation and inhibiting the growth of disease-producing organisms. The bedding material is unattractive to rodents and flies.

U.S. Pat. No. 4,311,115, issued on Jan. 19, 1982 to P. C. Litzinger, describes an aggregate composition that includes pulp mill solid waste material, and partially pyrolyzed cellulosic residue. The aggregate composition is designed for water absorbency and odor absorbency and is suitably adapted for use as an animal litter product. Paper mill solid waste material is suitably compressed so as to form a wet aggregate product and then dried.

U.S. Pat. No. 3,828,731, issued on Aug. 13, 1974 to P. L. White, teaches animal litter formed of high purity alphacellulose paper stock fibers in the form of pieces cut from a sheet of material and into which has been incorporated at least microbial inhibitor to inhibit the formation of odor-causing bacteria. The litter material also includes surface active agents to increase liquid absorbability of the cellulose stock material.

U.S. Pat. No. 4,203,388, issued on May 20, 1980 to Cortigene et al., describes an animal litter that is prepared by de-watering rejects of a secondary fiber plant. Sodium bicarbonate is incorporated into the material.

U.S. Pat. No. 4,263,873, issued on Apr. 28, 1981 to G. Christainson, provides an animal litter and method of preparation. This animal litter includes cellulose litter material that contains a pheromone-like attractant substance which makes the litter attractive to animals. The pellets on this litter material are formed from ground paper which has been moistened with sufficient water to hold the particles together. An acid salt can be added to the water as a dry powder to the ground paper.

U.S. Pat. No. 4,305,345 issued on Dec. 15, 1981 to M. Otoguro, provides a process for the manufacture of pulp-contained particles for the treatment of excrement. Hot water and a filler are added to paper pulp in a solidified condition and are agitated to form a slurry of the paper pulp. The slurry is then dehydrated so that lumps of pulp are produced that are cut into a plurality of smaller lumps.

U.S. Pat. No. 4,458,629, issued on Jul. 10, 1984 to M. L. Gerber, discloses a litter for mammals and fowl. The litter is composed of defibered cellulosic materials that are mixed with chemicals. The composition is chemically of a basic pH and is compressed into pellet form to provide improved handling qualities.

U.S. Pat. No. 4,541,359, issued on Sep. 17, 1985 to Hickey et al., discloses a degradeable litter for use in the brooding area of poultry houses. The litter covering comprises a sheet of paper which is gradually degradeable into litter within twenty-eight days. The paper is treated with ferrous sulphate hepta hydrate for ammonia control and is sufficiently water absorbent to facilitate moisture control in the poultry house. The litter covering serves as a physical barrier between the poultry and the litter and a barrier for masking ammonia produced from the used litter.

U.S. Pat. No. 5,807,465, issued on Sep. 15, 1998 to Kanapick et al., discloses a granular material containing recycled paper components. This waste paper is used to produce a highly absorbent, fiber-free granule, which can be used as an agricultural chemical carrier. The process maximizes the amount of long fiber sent to the paper machine.

U.S. Pat. No. 6,386,144, issued on May 14, 2002 to T. D. Cathey, shows a method of manufacturing absorbent material for conversion to fertilizer. The highly absorbent material is saturated with nutrient-rich animal excrement. This is an organic fertilizer from a highly absorbent animal bedding material that is manufactured from recycled waste paper, cotton fiber and cotton gin waste, and gypsum. The recycled waste materials are combined to form a slurry mixture for processing by conventional paper-making machinery into sheet material.

It is an object of the present invention to provide a method that improves fly control within chicken house environment.

It another object to the present invention to provide a method which improves moisture absorption from the manure produced by chickens in the chicken house.

It is a further object of the present invention to provide a method which makes practical use of short paper fibers from the paper mill.

It is another object of the present invention to provide a method which will reduce pesticide usage within the chicken house environment.

It is another object of the present invention to provide a method treating the waste from a chicken house which decreases the production of ammonia gas from the chicken house.

It is another object of the present invention to provide a method for treating the waste from the chicken house which reduces the cost of fuel to the operator of the chicken house and for the person securing the treated waste for application to land.

It is a further object of the present invention to provide a method which improves the spreadability of the treated chicken manure.

It is a further object of the present invention to provide a method which enhances the distribution of particles during the spreading of the manure on the land.

It is another object of the present invention to provide a method for treating chicken house waste which, when applied to land, enhances crop yield.

It is a further object of the present invention to provide a method for treating chicken house waste which makes the manure produced therefrom more usable in a larger number of markets.

It is another object of the present invention to provide for treating chicken house waste which enhances revenues to the farmer.

It is still another object of the present invention to provide chicken house waste which decreases phosphorous levels in the treated chicken manure.

These and other objects and advantages of the present invention will become apparent from a reading of the attached specification and appended claims.

BRIEF SUMMARY OF THE INVENTION

The present invention is a method for treating waste from chickens in a chicken house comprising the steps of: (1) applying a layer of short paper fibers over a surface in the chicken house so as to be horizontally below the chickens in the chicken house; (2) mixing manure from the chickens in the chicken house with the layer of short paper fiber; and (3) removing the mixed manure and layer of short paper fibers from the chicken house.

This method of the present invention further includes the steps of transporting the short paper fibers from a paper mill to the chicken house. The layer of short paper fibers has a depth of between four inches and forty-eight inches. The layer of short paper fibers is spread over the floor of the chicken house such that the manure from the chicken house will fall directly upon the spread layer of the short paper fibers.

In the present invention, the step of mixing includes turning the manure with the layer of short paper fibers such that the manure and the short paper fibers are intimately mixed together. In the preferred embodiment of the present invention, this method of turning includes driving a windrow turner in the chicken house, funneling the manure and the short paper fibers into the windrow turner as the windrow turner drives through the chicken house, auger mixing the manure and the short paper fibers in the windrow turner, and depositing the auger-mixed manure and short paper fibers rearwardly of the windrow turner. During the step of mixing, the short paper fibers and the manure exothermically react so as to produce a temperature of between 120° and 160° F. within the mixture.

Acidifying agents are added to the short paper fibers prior to being applied within the chicken house. These acidifying agents are used so as to bring a pH of the short paper fibers to below 7.5. These acidifying agents can include sulfur, sodium bisulfide, sulfuric acids and mixtures thereof.

The removed mixed manure and the short paper fibers are loaded onto a truck and then transported so as to be applied to land.

DETAILED DESCRIPTION OF THE INVENTION

Figure 1:
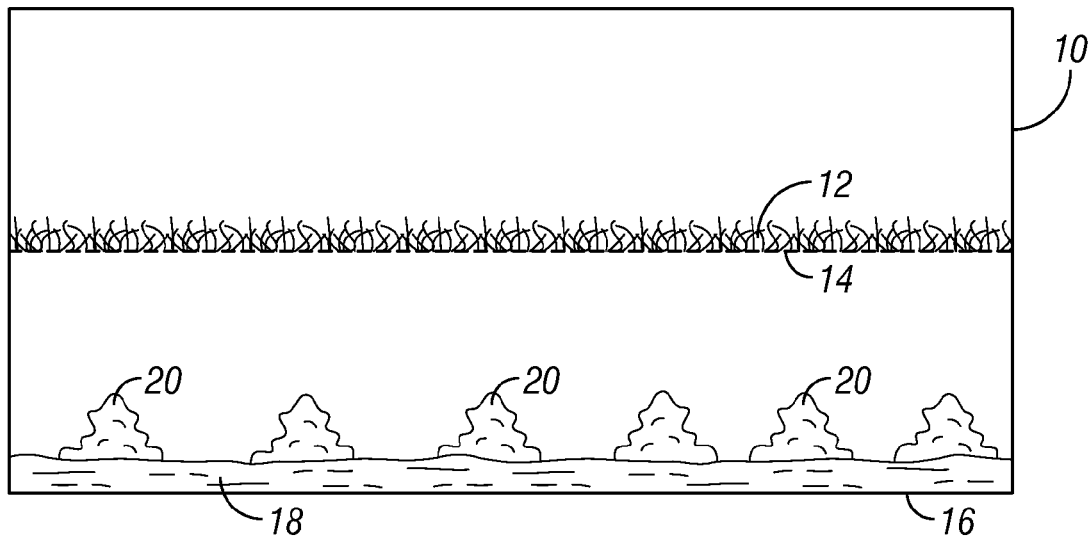
FIG. 1 is an illustration shown an initial step of the method of present invention on the interior of a chicken house.

FIG. 1 shows an initial step of the method of the present invention. In FIG. 1, there can be seen a chicken house 10 that has a plurality of chickens 12 nesting on a surface 14 located well above a floor 16 of the chicken house 10. In the initial step of the present invention, a layer of short paper fibers 18 is applied across the floor 16 of the chicken house 10. This layer 18 rests below the chicken 12 such that the manure from the chickens will drop vertically downwardly upon the horizontal layer of short paper fibers 18. The manure is illustrated in piles 20 extending upwardly from the layer 18 of short paper fibers.

It should be noted that in normal operation of chicken houses, several layers of chickens 12 will reside within the chicken house 10. Various devices, such as scraper boards, are used so as to direct the manure to locations on the layer 18 of short paper fibers. These scraper boards are in the nature of inclined boards located below a particular layer of chickens such that the waste of the chicken is deposited on the scraper board and then scraped therefrom so as to fall downwardly onto the layer 18. Through the use of these scraper boards, it can be seen that pile 20 of manure will accumulate onto the top surface of the layer 18 of short paper fibers. The use of scraper boards allows for the directing of the chicken manure to desired location and to avoid the contamination of the chickens with the manure of chickens located at higher levels. The use of such scraper boards and multiple layers of chickens are well known within the poultry industry.

The layer 18 of short paper fibers will have a depth of between four and forty-eight inches within the chicken house 10. Conventionally, the surface 14 supporting the chickens 12 will be located approximately ten feet above the floor 16. When a great deal of waste is produced by the chickens 12, then it may be desirable to incorporate a greater depth of short paper fibers 18 within the chicken house 10.

Figure 2:
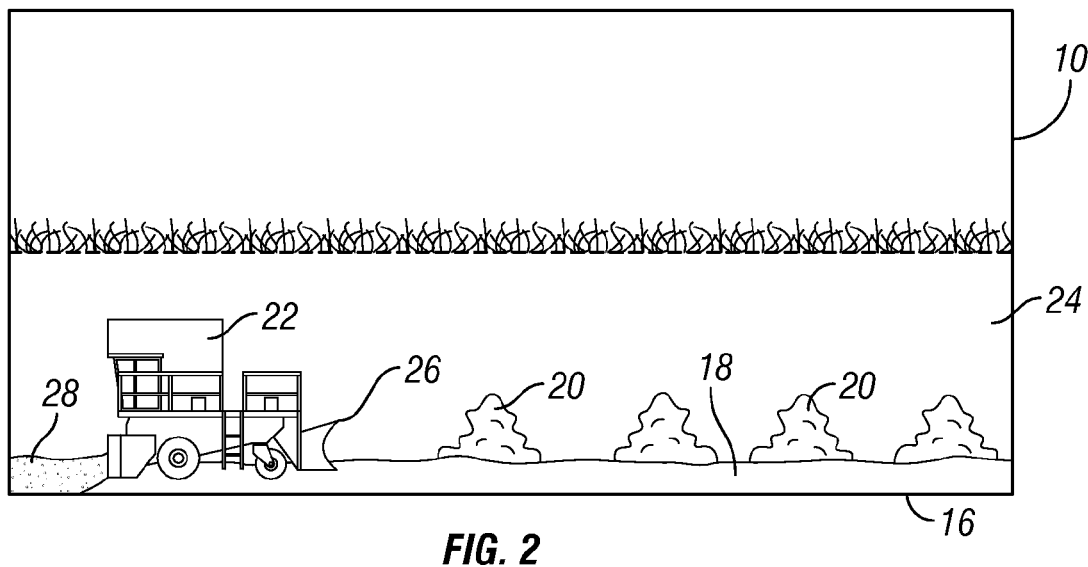
FIG. 2 is a side elevational view showing the use of a windrow turner within the interior of the chicken house in accordance with an intermediate step of the present invention.

In FIG. 2, it can be seen that a windrow turner 22 has been introduced to the interior 24 of the chicken house 10. The windrow turner 22 can be driven along the floor 16 of the chicken house 10. The windrow turner 22 includes a shovel 26 at a forward end thereof. The shovel 26 serves to direct the manure piles 20, along with the short paper fibers of layer 18, into the interior thereof. As will be described hereinafter, the windrow turner 22 includes suitable augers which will allow for an intimate mixing of the short paper fibers 18 and the manure 20. The mixed short paper fibers and manure are deposited as an intimate mixture 28 rearwardly of the windrow turner 22.

Figure 3:
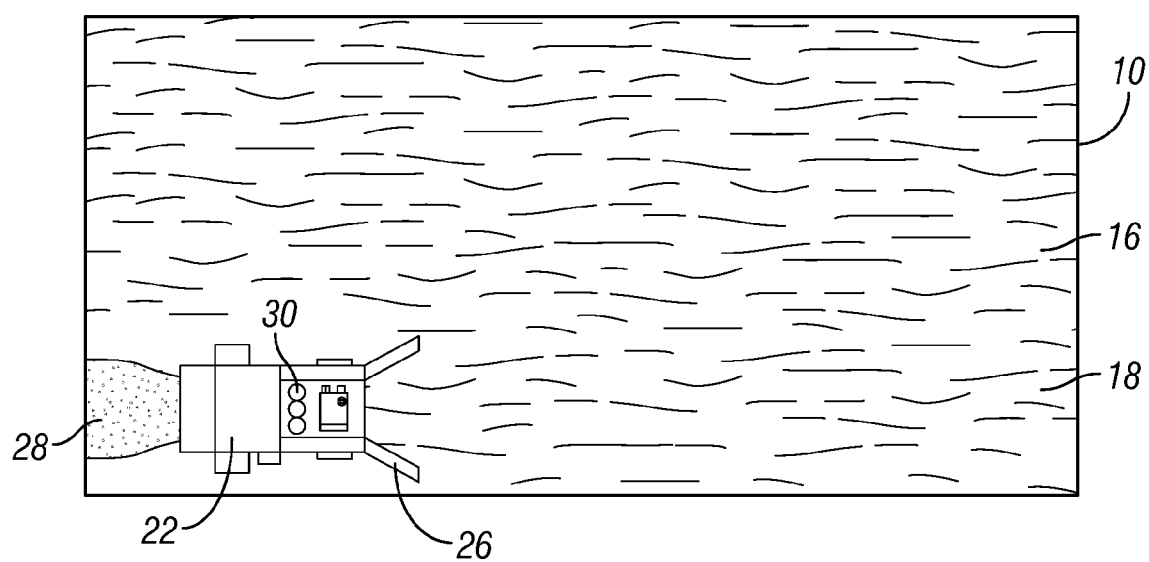
FIG. 3 is a plan view of FIG. 2 showing the windrow turner within the interior of the chicken house and carrying out an intermediate step of the method of present invention.

In FIG. 3, it can be seen that the windrow turner 22 has its shovel 26 located at the front end thereof. Augers 30 are positioned rearwardly of shove 26. Shovel 26 is in the nature of a funnel which is located in close proximity to the floor 16 of the chicken house 10 while also serving to direct the short paper fibers 18 on the manure into the augers 30 and through the windrow turner 22. The augers will suitably rotate so as to strongly mix the manure 20 and the short paper fibers 18 together so that the intimate mixture 28 can be deposited rearwardly of the windrow turner 22.

In normal use, the windrow turner 22 can serve to mix the short paper fibers 18 and the manure 20 on a daily basis up to mixing every two weeks. Various other devices can be also used so as to intimately mix the manure 20 with the short paper fibers 18. These devices can include bucket loaders, belts, conveyers, scrapers, and other device that can suitably agitate the manure and short paper fibers together.

The resultant mixed product 28 will inherently dry out due to the tendency of the short paper fibers to absorb moisture. The turning can be done on a daily basis up to a two week period, or any interval in between, based upon the operating standards of the egg-laying operation. Once the droppings are turned into the amended short paper fibers, an active biological process occurs that generates heat which further dries out the chicken droppings.

Eventually, the end product 28 can be removed from the interior of the chicken house 10. Typically, a truck can be used to haul the intimate mixture of short paper fibers and manure to a location away from the chicken house. It can then be taken from the truck and spread onto the land for use on the fertilizer.

Figure 4:
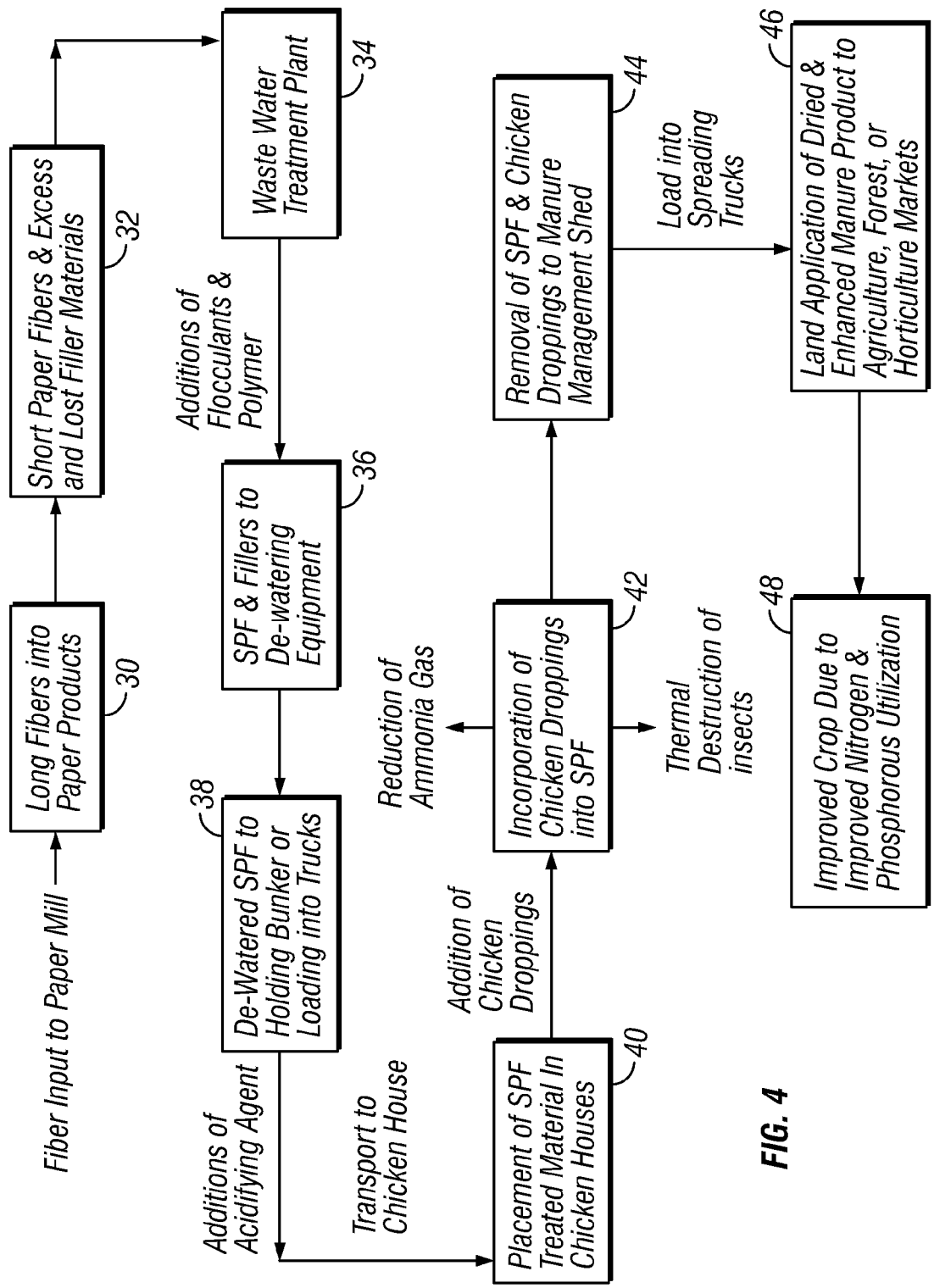
FIG. 4 illustrates the method of the present disclosure.

FIG. 4 illustrates the entire method of the present invention. Initially, various cellulosic materials serve as a fiber input to a paper mill. The step 30 will convert the cellulosic fiber input at the paper mill into long fibers for use on paper products. The paper mill sludge is processed in step 32 as short paper fibers, excess and lost filler materials. The short paper fibers contain short paper fibers that are too short to be utilized in the step 30 for the final paper product. The short paper fibers that are shown in step 32 can also include paper fillers such as calcium carbonate, starches, titanium oxide, kaolin clay, and biological microorganisms used to purify the water in the treatment process. The paper mill sludge produced in step 32 is then delivered to a waste water treatment plant 34. The waste water treatment plant can include a suitable clarifier so that the suspended solids can settle to the bottom of the waste water treatment plant. The settling of the short paper fibers in the waste water treatment plant 34 can be enhanced by the addition of flocculants and polymers into the waste water treatment plant 34. The settled short paper fibers from the waste water treatment plant 34 are then delivered to de-watering equipment 36. The de-watering equipment can include a variety of items which serve to remove water from the short paper fibers. his de-watering equipment can include wedges that squeeze the short paper fibers, V-presses, conveyer belts, centrifuges, and other items which serve to de-watered the short paper fibers to twenty-five percent to fifty percent solids. The de-water short paper fibers are then passed to a step 38 in which they are held in a bunker or loaded onto trucks. An acidifying agent can then be added to the de-watered short paper fibers in step 38. Such an acidifying agent is used to lower the pH to below 7.5. The acidifying agent can be added prior to or after the short paper fibers are placed in the chicken house 10. The acidifying agent can include sulfur, sodium bisulfate, sulfuric acid, and other acids so as to accomplish this purpose. However, since the purpose of the present invention is to avoid the production of ammonia, any nitrogenous material should be avoided. The de-watered and acidified short paper fibers can then be transported by a truck to the chicken house 10.

The next step in the process is the step 40 of placing the short paper fibers in the chicken house 10. These short paper fibers are applied in the manner described herein previously. Droppings will fall from the chickens onto the short paper fibers within the chicken house. The step of mixing 40 is then carried out so that the chicken droppings are incorporated into the short paper fibers. This will serve to reduce the production of ammonia gas and cause a thermal destruction of insects, as will be described hereinafter. The short paper fibers and the manure from the chickens, after having been suitably mixed, can then be removed in accordance with step 44 to a manure management shed. The manure management shed can then be loaded onto a spreading truck so as to deliver the manure for land application in step 46. The dried and enhanced manure product can be applied to the land associated with agriculture, forests and horticulture markets. The result of such a land application in step 46 results in an improved crop in accordance with the step 48 because of the improved nitrogen and phosphorous utilization.

The present invention provides better fly control, reduced pesticide usage and a better manure end-product. By using the biological thermal heat generated from turning the chicken droppings into the short paper fibers, one can achieve excellent fly control. The short paper fibers have tremendous insulation properties. As such, it is easy to generate internal temperatures of between 120° and 160° F. Such high temperatures can destroy the larva of the flies so as to prevent them from maturing into adult flies. By controlling the larva stage, one greatly reduces the fly population for each adult fly. This is important since each adult fly has the capability to lay 100,000 eggs. By turning the short paper fibers with the manure, the larva stages of the flies are turned into the hottest area of the amended short paper fibers. Such a temperature is needed for larva destruction. The amended short paper fibers result in a biological thermal temperature high enough for this destruction. The short paper fibers and mixed manure are used to produce a final manure product that does not contain any residuals of the pesticides that would normally be used in controlling flies. By reducing the number of flies within the chicken house, the cost and requirements for pesticide usage by the farmer are also significantly reduced.

The present invention is also effective in the reduction of ammonia gas generated from the chicken droppings. These chicken droppings are very high in nitrogen. As chicken droppings accumulate under the bird cages, large quantities of ammonia gas are generated. The short paper fibers, along with the acidifying agent, produce a medium matrix which results in the nitrogen being chemically fixed into the short paper fibers. As a result, there is a reduction in ammonia gas.

The end manure product is greatly enhanced by using the present invention. The moisture content of the end product is greatly reduced. This results in fuel cost savings, better spreadability, better distribution of particles during spreading operations, results in better crop uptake and higher yields, and produces more markets that can utilize such a product. Since the ammonia gas production is produced, a greater amount of nitrogen will wind up in the final manure product. This makes the product more valuable to the end user and produces higher revenues to the farmer selling the end product. Since the end product of the present invention reduces the available phosphorous content, the end product of the present invention is available for higher application rates to fields, forests and horticulture industry under the new CAFO regulations. As a result, the farmer is able to reduce the acreage necessary to utilize the end product manure by being able to increase the application rate per acre of land fertilized.

The foregoing disclosure and description of the invention is illustrative and explanatory thereof. Various changes in the details of the described method can be made within the scope of the present claims without departing from the true spirit of the invention. The present invention should only be limited by the following claims and their legal equivalents.

I claim:

1. A method of treating waste from chickens in a chicken house so as to both reduce ammonia generation from the chicken waste and destroy fly larva within the chicken waste, the method comprising:
    applying a layer of short paper fibers over a surface in the chicken house, the surface being horizontally below the chickens housed in the chicken house and generally in the path of chicken manure, wherein the chicken manure that falls from the chickens is substantially free of boiler litter or chicken bedding;
    mixing the manure from the chickens in the chicken house with the layer of short paper fibers; and
    removing the mixed manure and layer of short paper fibers from the chicken house.

2. The method of claim 1, further comprising:
    transporting the short paper fibers from a paper mill to the chicken house.

3. The method of claim 1, wherein the layer of short paper fibers is between four inches and forty-eight inches in depth.

4. The method of claim 1, the step of applying a layer of short fibers comprising:
    spreading the layer of short paper fibers over a floor of a chicken house such that manure from the chickens will fall directly upon the applied layer of short paper fibers.

5. The method of claim 1, the step of mixing comprising:
    turning the manure with said layer of short paper fibers such that the manure and the short paper fibers of the layer are intimately mixed together.

6. The method of claim 5, the step of turning comprising:
    driving a windrow turner into the chicken house;
    funneling the manure and the short paper fibers of the layer of short paper fibers into the windrow turner as the windrow turner drives through the chicken house;
    auger mixing the manure and the short paper fibers in the windrow turner; and
    depositing the auger-mixed manure and short paper fibers rearwardly of the windrow turner.

7. The method of claim 1, the step of mixing comprising:
    exothermically reacting the layer of short paper fibers with the manure so as to produce an internal temperature of between 120° F. and 160° F. within the chicken manure short paper fiber mixture.

8. The method of claim 1, further comprising:
    adding acidifying agents to the short paper fibers so as to bring a pH of the short paper fibers to below 7.5.

9. The method of claim 8, the acidifying agents being selected from the group consisting of sulfur, sodium bisulfide, sulfuric acid and mixtures thereof, and the acidification of short fibers being done after the short paper fibers are placed in the chicken house.

10. The method of claim 1, further comprising:
    loading the removed mixed manure and the short paper fibers onto a truck; and
    applying the removed mixture of manure and short paper fibers onto land.

11. A pesticide-free method of treating waste from chickens in a chicken house so as to reduce ammonia generation from the chicken waste and destroy fly larva within the chicken waste, the method comprising:

obtaining short paper fibers from a paper mill;

adding acidifying agents to the short paper fibers so as to bring the pH of the short paper fibers to less than 7.5;

applying a layer of the acidified short paper fibers to a floor of the chicken house such that manure from the chickens will fall upon the layer, the manure from the chickens being substantially free of chicken bedding;

mixing the manure from the chickens in the chicken house with the layer of short paper fibers to form a paper fiber/chicken manure mixture, the mixing being performed for a period of time sufficient to produce an exothermic reaction within the mixture, the exothermic reaction increasing the internal temperature of the mixture to between 120° F. and 160° F. and destroying insect larva within the manure; and removing the manure and the short paper fibers from the chicken house.

12. The method of claim 11, the layer of acidified short paper fibers having a depth of between four inches and forty-eight inches.

13. A pesticide-free method of treating waste from chickens in a chicken house so as to both reduce ammonia generation from the chicken waste and destroy fly larva within the chicken waste, the method consisting essentially of:

transporting short paper fibers from a paper mill to the chicken house;

applying a layer of short paper fibers between four inches and forty-eight inches in depth over a surface in the chicken house, the surface being horizontally below the chickens in the chicken house and generally in the path of chicken manure;

mixing manure from the chickens in the chicken house with the layer of short paper fibers by exothermically reacting the layer of short paper fibers with the manure so as to produce an internal temperature of between 120° F. and 160° F. within the chicken manure short paper fiber mixture;

adding acidifying agents to the short paper fibers so as to bring a pH of the short paper fibers to below 7.5; and removing the mixed manure and layer of short paper fibers from the chicken house.

14. The method of claim 13, the step of mixing comprising:

turning the manure with said layer of short paper fibers such that the manure and the short paper fibers of the layer are intimately mixed together.

15. The method of claim 14, the step of turning consisting of:

driving a windrow turner into the chicken house;

funneling the manure and the short paper fibers of the layer of short paper fibers into the windrow turner as the windrow turner drives through the chicken house;

auger mixing the manure and the short paper fibers in the windrow turner; and depositing the auger-mixed manure and short paper fibers rearwardly of the windrow turner.

16. The method of claim 13, the acidifying agents being selected from the group consisting of sulfur, sodium bisulfide, sulfuric acid and mixtures thereof, and the acidification of short fibers being done after the short paper fibers are placed in the chicken house.

* * * * *